US009012000B2

(12) United States Patent
Trautz et al.

(10) Patent No.: US 9,012,000 B2
(45) Date of Patent: Apr. 21, 2015

(54) SPACER

(71) Applicant: S & T Components GmbH & Co. KG, Remchingen-Noettingen (DE)

(72) Inventors: Heiko Trautz, Remchingen-Noettingen (DE); Hans Trautz, Remchingen-Noettingen (DE)

(73) Assignee: S & T Components GmbH & Co. KG, Remchingen-Noettingen (DE)

( * ) Notice: Subject to any disclaimer, the term of this patent is extended or adjusted under 35 U.S.C. 154(b) by 0 days.

(21) Appl. No.: 13/655,484

(22) Filed: Oct. 19, 2012

(65) Prior Publication Data

US 2013/0108815 A1 May 2, 2013

Related U.S. Application Data

(63) Continuation of application No. PCT/EP2011/056284, filed on Apr. 20, 2011.

(30) Foreign Application Priority Data

Apr. 20, 2010 (DE) ........................ 10 2010 015 836

(51) Int. Cl.
*B32B 23/00* (2006.01)
*E06B 3/663* (2006.01)
*B32B 1/02* (2006.01)

(52) U.S. Cl.
CPC ......... *E06B 3/66304* (2013.01); *E06B 3/66319* (2013.01); *E06B 2003/6638* (2013.01)

(58) Field of Classification Search
USPC ............ 428/34.1, 34.2, 35.7, 35.9, 36.9, 35.8
See application file for complete search history.

(56) References Cited

U.S. PATENT DOCUMENTS

| | | | | |
|---|---|---|---|---|
| 5,182,162 | A * | 1/1993 | Andrusko | 428/219 |
| 5,962,090 | A | 10/1999 | Trautz | 428/34 |
| 6,185,899 | B1 | 2/2001 | De Niet | 52/762 |
| 6,389,779 | B1 | 5/2002 | Brunnhofer | 52/786.13 |
| 6,537,629 | B1 | 3/2003 | Ensinger | 428/36.9 |
| 7,449,224 | B2 * | 11/2008 | Ensinger | 428/36.9 |

FOREIGN PATENT DOCUMENTS

| | | |
|---|---|---|
| DE | 195 33 685 A1 | 3/1997 |
| DE | 198 05 348 A1 | 8/1999 |
| DE | 198 07 454 A1 | 8/1999 |
| WO | WO 00/05475 | 2/2000 |

OTHER PUBLICATIONS

ISA/EP; English language translation of International Preliminary Report on Patentability (Chapter 1); issued by WIPO Oct. 23, 2012; 8 pp.

* cited by examiner

*Primary Examiner* — Marc Patterson
(74) *Attorney, Agent, or Firm* — Harness, Dickey & Pierce, P.L.C.

(57) ABSTRACT

A spacer for multi-pane insulating glazing, comprising a main body, which has mutually parallel abutment surfaces for panes, and an outer face and an inner face, which respectively connect the two abutment surfaces, the main body being made of plastic and having at least one metal layer on the outer face. The spacer also has a metal or a non-metal mesh, which is embedded in the main body.

28 Claims, 3 Drawing Sheets

SPACER

CROSS-REFERENCES TO RELATED APPLICATIONS

This application is a continuation of copending international patent application PCT/EP2011/056284 filed on Apr. 20, 2011 and designating the U.S., which claims priority of German patent application DE 10 2010 015 836, filed on Apr. 20, 2010. The entire contents of these priority applications are incorporated herein by reference.

BACKGROUND OF THE INVENTION

The present invention relates to a spacer for multi-pane insulating glazing, comprising a main body, which has mutually parallel abutment surfaces for panes, and an outer face and an inner face, which respectively connect the two abutment surfaces, the main body being made of plastic and having at least one metal layer on the outer face.

A spacer of the aforementioned type is known for example from DE 195 33 685 A1. Although this type of spacer has proven to be successful in practice, there is still the desire to improve it, in particular with regard to strength and thermal conductivity characteristics.

SUMMARY OF THE INVENTION

The object of the present invention is therefore to develop the spacer mentioned at the beginning in such a way that, while being easy to produce, it has high stability and a low thermal conductivity.

This object is achieved in the case of the spacer mentioned at the beginning by providing a metal mesh, which is embedded in the main body.

That is to say in other words that the spacer consists of a plastic, a metal mesh being provided in the plastic for reinforcement. With the aid of the embedded metal mesh, it is possible to further reduce the wall thicknesses of the main body, usually formed as a hollow profile, without encountering strength problems. A reduced wall thickness has the result that the thermal conductivity of the main body is reduced. In addition, the embedded metal mesh has the advantage that the spacers no longer bend as easily.

Within the scope of the present invention, "mesh" should be understood as meaning any type of woven, nonwoven, braided or knitted fabric that is produced from continuous fibers. In particular, the mesh is a sheet-like formation of thin wires or fibers with regular meshes or openings. The meshes or openings may be, for example, of a rhomboidal, square or hexagonal form. The mesh width in the case of rectangular openings may be, for example, in the range of 0.84 by 1 mm. The diameter of the wire or the fibers may be in the range of 0.16 mm.

In comparison with solutions in which a metal foil is embedded in the main body, a metal mesh has the advantage that the plastic does not become detached from the metal mesh. Detachment of the plastic may under some circumstances lead to moisture problems.

The production of the spacer according to the invention is easy, since the metal mesh can be supplied during the usual extrusion process for producing the hollow profile main body.

The use of an embedded metal mesh additionally has the advantage that the plastic does not become detached from the metal mesh under thermal expansion, as would be the case with a metal foil. The creation of voids in the main body can be avoided in this way.

In comparison with solutions in which, for example, glass fibers are admixed with the plastics material for reinforcement, the present invention has the advantage that the production process can be mastered more easily. The addition of glass fibers is problematic to the extent that an insufficient amount does not produce the hoped-for reinforcing effect and an excessive amount makes the material become very brittle. In addition, it is problematic to make the wall thicknesses any thinner.

By contrast with the previous solutions with plastics reinforced by short and long fibers, in the case of the solution according to the invention there are no fibers in the outer region. Since the heat transfer of the fibers is generally higher than that of the plastic, the heat transfer of the spacer is increased in the case of the previous solutions. The spacer according to the invention has no fibers in the outer regions, so that a reduction in the heat transfer can be noted.

Apart from a metal mesh, meshes of non-metal fibers may also be used. They also lead to similar properties and improve the insulating properties of the spacer. Non-metal fibers are, for example, inorganic fibers, such as basalt fibers, boron fibers, glass fibers, ceramic fibers, silica fibers, organic fibers, such as aramid fibers, carbon fibers, polyester fibers, nylon fibers, polyethylene fibers, plexiglass fibers, or natural fibers, such as wood fibers, flax fibers, hemp fibers or sisal fibers.

In the case of a preferred development, the metal mesh or the non-metal mesh extends all around, along the abutment surfaces and the outer face and the inner face.

That is to say in other words that—when seen in the cross section of the main body—the metal mesh or the non-metal mesh runs completely around the periphery within the main body. The advantage of this measure is that the strength can be further increased in comparison with a solution in which the metal mesh or the non-metal mesh is not provided in all parts of the main body—when seen in cross section. It goes without saying that the peripheral metal mesh or non-metal mesh does not have to be formed in one piece, but that it is also possible to provide two or more mesh portions, which may partially overlap or be at a certain distance from one another.

In the case of a preferred development, the metal mesh is produced from high-grade steel. More preferably, the metal mesh or the non-metal mesh has a mesh width in the range of 1 mm by 1 mm, preferably 0.8 mm by 1 mm. The fibers of the metal mesh or the non-metal mesh preferably have in each case a diameter of 0.1 mm to 0.2 mm.

These measures have been found to be particularly advantageous.

In the case of a preferred development, the metal layer runs from one abutment surface via the outer face to the other abutment surface. It is particularly preferred, however, to interrupt the metal layer in a region in strip form, a sealing material, preferably butyl (butyl rubber), preferably being provided in this region in strip form. It is most particularly preferred for a bead to be provided in the outer face, the region in strip form lying against the base of the bead.

These measures have been found to be particularly advantageous with regard to the thermal conductivity. In particular, the interruption of the metal layer at the outer face provides that the thermal conductivity between the two abutment surfaces of the main body is reduced.

It goes without saying that the features mentioned above and those still to be explained below can be used not only in the respectively specified combination but also in other combinations or on their own without departing from the scope of the present invention.

BRIEF DESCRIPTION OF THE DRAWINGS

Further advantages and configurations of the invention emerge from the description and the accompanying drawing, in which.

DETAILED DESCRIPTION OF PREFERRED EMBODIMENTS

Figure 1:
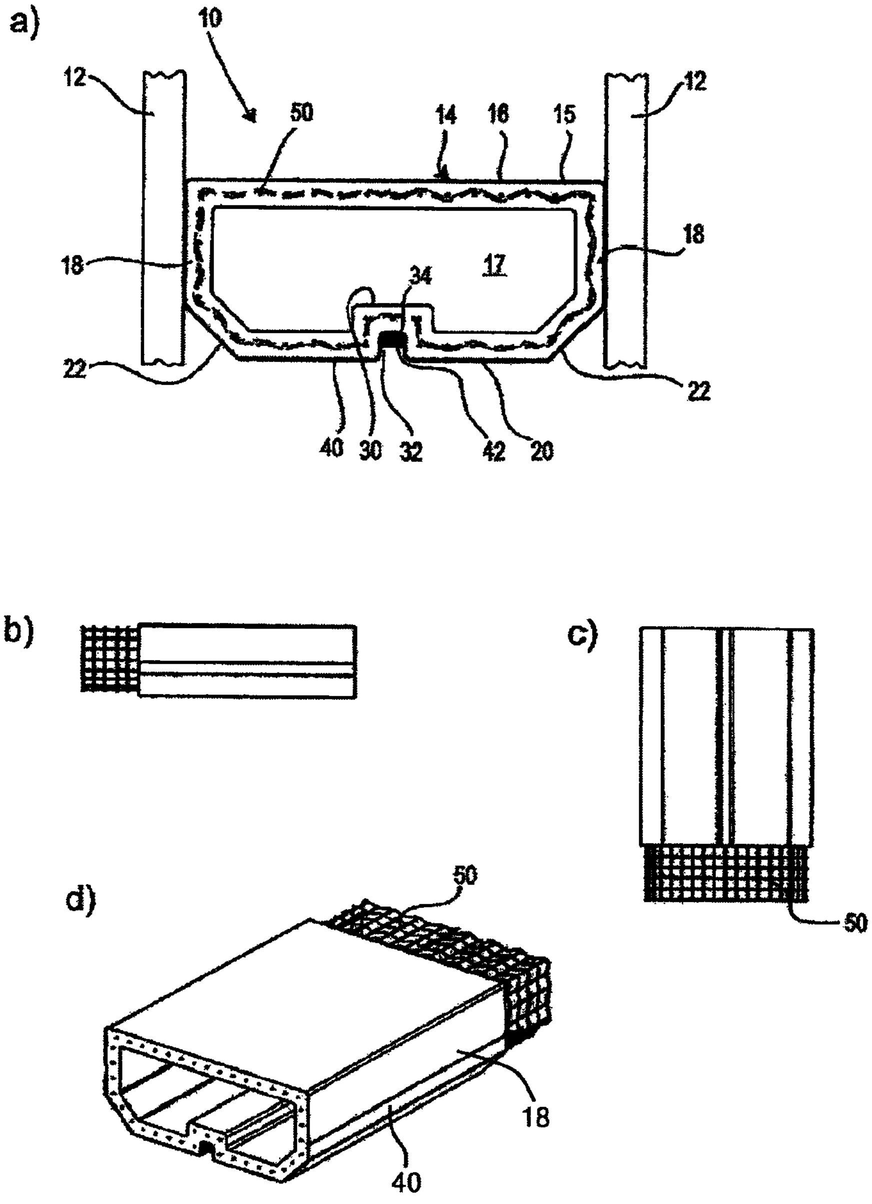
FIG. 1*a*) is a front view of a spacer according to the present invention.
FIG. 1*b*) is a side view (at a smaller scale) of the spacer shown in FIG. 1*a*)
FIG. 1*c*) is a bottom view (at a smaller scale) of the spacer shown in FIG. 1*a*)
FIG. 1*d*) is a perspective view (at a smaller scale) of the spacer shown in FIG. 1*a*)

In FIG. 1*a*), a spacer is schematically represented in cross section and identified by the reference numeral 10. The spacer 10 serves the purpose on the one hand of keeping two schematically indicated panes 12 of a multi-pane insulating glazing unit at a distance and on the other hand of sealing the space between the panes 10. Since the function of a spacer 10 is generally known, it is not discussed any further.

The spacer comprises an elongated, preferably extruded, main body 14, which has a cavity and in FIG. 1*a*) is represented in a section perpendicular to the longitudinal axis. The main body 14 has—when seen in cross section—a wall 15, which runs along the longitudinal axis and completely surrounds the inner space 17 of the main body 14. The wall thickness of the wall 15 is preferably the same overall.

The wall 15 is divided into two abutment surfaces 18, which run mutually parallel and are designed for abutting the panes 12. The two abutment surfaces 18 are connected to each other by an inner face 16, the inner face 16 facing the inner space of the multi-pane insulating glazing unit. The inner face 16 is of a planar form and extends perpendicularly to the two abutment surfaces 18.

Lying opposite the inner face 16 is an outer face 20, which changes at both of its edges respectively facing a pane 12 into a sloping surface 22, which is then connected to the respective abutment surface 18.

Provided in the middle of the outer face 20, and running in the longitudinal direction, is a bead 30, which protrudes into the inner space 17 and forms a longitudinally running depression or groove 32 on the outer face 20. The bead 30 serves in particular for increasing the strength or stiffness of the elongated spacer 10. It goes without saying that it would also be conceivable in an alternative configuration to omit the bead 30 and to make the outer face 20 planar.

Applied to the outer face 20 of the main body 14, in particular adhesively attached by means of a PU adhesive, is a metal foil 40. The metal foil 40 extends from one of the two abutment surfaces 18 over the first sloping surface 22, the outer face 20 and the second sloping surface 22 to the other abutment surface 18. As can best be seen from FIG. 1*d*), the ends of the metal foil 40 terminate in a lower region of the abutment surface 18, so therefore does not cover the entire abutment surface 18.

The metal foil 40 preferably consists of high-grade steel, a material thickness of 0.01 mm being chosen.

In the preferred embodiment shown, the metal foil 40 is interrupted in the region of the groove 32, so that the base of the groove 34 is not covered by the metal foil 40.

A sealing material, in the present exemplary embodiment butyl 42, is provided in the groove 32. The butyl 42 covers the base of the groove 34 completely and is introduced with a material thickness, so that there is also contact with the two ends of the metal foil 40.

As already indicated, the main body 14 is produced by way of extrusion as a hollow profile. The material used is a plastic, preferably a thermoplastic, for example Luran from the company BASF. By contrast with known solutions, however, the plastic is not mixed with glass fibers or the like.

During the extrusion process, a mesh, in particular a metal mesh or a non-metal mesh, which can be seen in FIGS. 1*a*) to 1*d*) and is identified by the reference numeral 50, is embedded in the main body 14. Hereafter, a metal mesh 50 is described purely by way of example. In the preferred exemplary embodiment, which is shown in FIG. 1*a*), the metal mesh—when seen in cross section—runs around the entire wall 15, that is to say along the inner face 16, the two abutment surfaces 18, the two sloping surfaces 22 and along the outer face 20. In relation to the wall thickness, the metal mesh 50 is arranged in the middle.

It goes without saying that the metal mesh 50 does not necessarily have to be provided in the wall 15 in such a way that it runs completely around the periphery. Rather, it would also be conceivable for a metal mesh to be provided only in individual regions of the wall 15.

The metal mesh is a sheet-like formation of thin metal wires or metal fibers with regular meshes or openings. The meshes or openings may be, for example, of a rhomboidal, square or hexagonal form. The mesh width in the case of rectangular openings may be, for example, in the range of 0.84 by 1 mm. The diameter of the metal wire may be in the range of 0.16 mm.

High-grade steel is preferably used as the material for the metal mesh, while a material that corresponds to the material of the metal foil 40 should be chosen in particular.

The metal mesh may be a node-less mesh or a mesh in which the crossing points are interlinked or stabilized in some other way.

Figure 2:
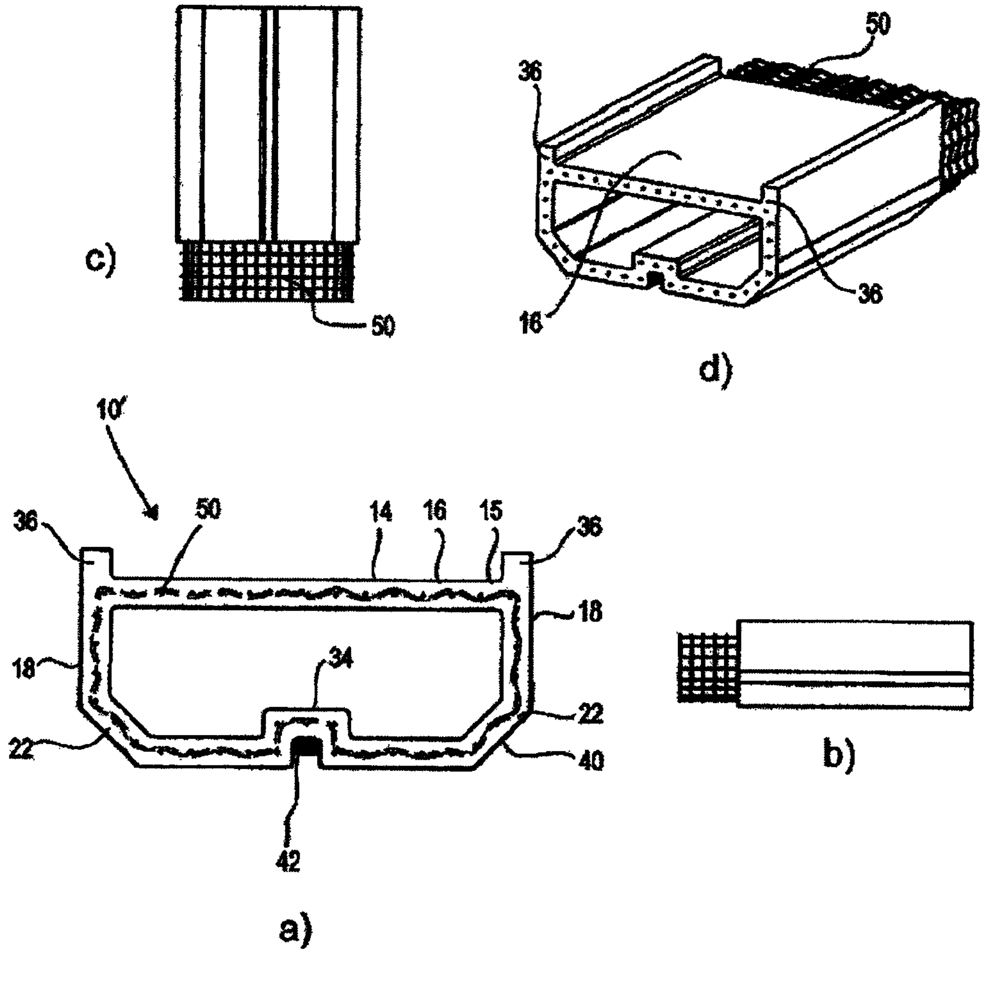
FIG. 2*a*) is a front view of a first alternative embodiment of the spacer according to the present invention.
FIG. 2*b*) is a side view (at a smaller scale) of the spacer shown in FIG. 2*a*)
FIG. 2*c*) is a bottom view (at a smaller scale) of the spacer shown in FIG. 2*a*)
FIG. 2*d*) is a perspective view (at a smaller scale) of the spacer shown in FIG. 2*a*)

In FIGS. 2*a*)-2*d*), a spacer according to a further embodiment is represented, the same parts being designated by the same reference numerals as in FIGS. 1*a*)-1*d*). The spacer, which is identified by the reference numeral 10', differs only insignificantly from the spacer 10 described. In particular, the two abutment surfaces 18 are of an extended form, so that ridges 36 project from the inner face 16. The inner face 16 consequently lies somewhat lower than the upper edge of the ridges 36, as can also be seen in FIG. 2*d*).

The advantage of this embodiment is that the thermal conductivity between the two abutment surfaces 18 is further reduced.

Figure 3:
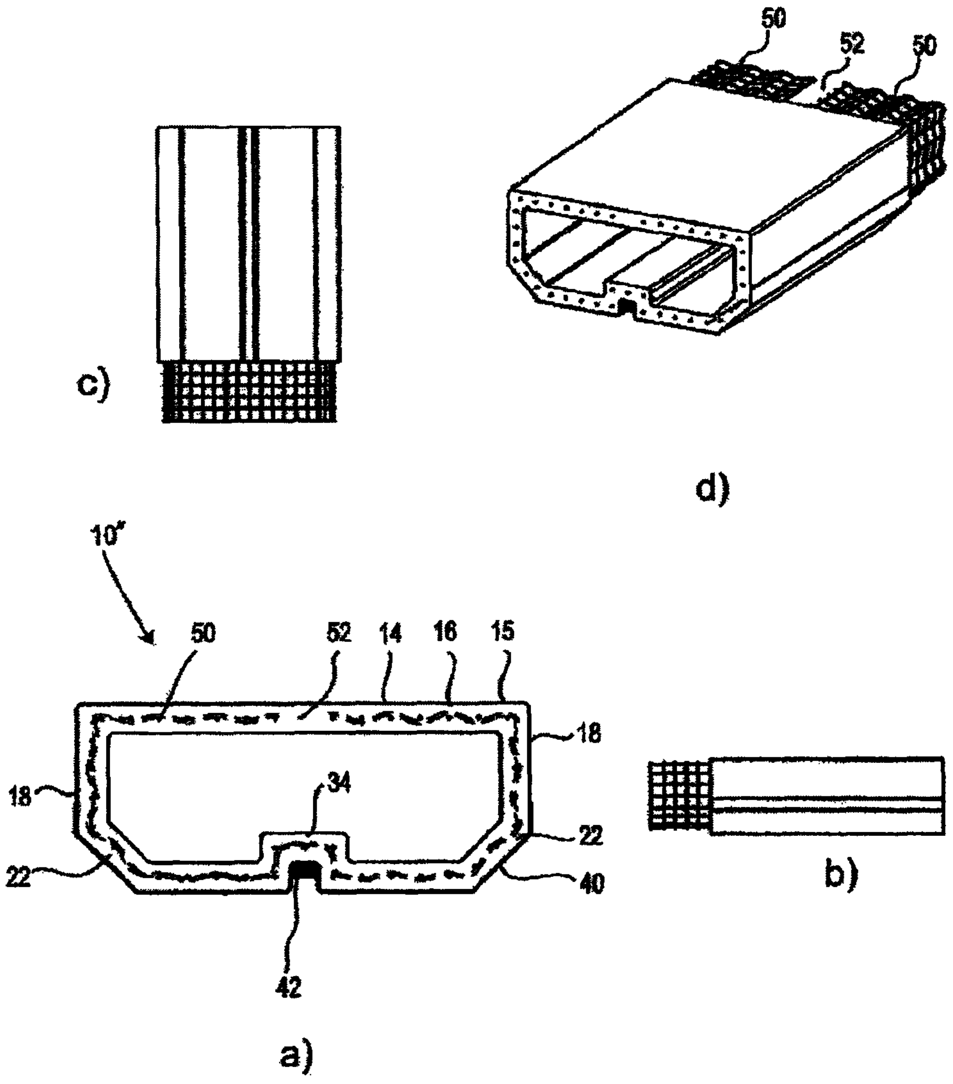
FIG. 3*a*) is a front view of a second alternative embodiment of the spacer according to the present invention.
FIG. 3*b*) is a side view (at a smaller scale) of the spacer shown in FIG. 3*a*)
FIG. 3*c*) is a bottom view (at a smaller scale) of the spacer shown in FIG. 3*a*.
FIG. 3*d*) is a perspective view (at a smaller scale) of the spacer shown in FIG. 3*a*).

In FIGS. 3*a*)-3*d*), a third embodiment of a spacer is represented and is identified by the reference numeral 10". This spacer 10" corresponds substantially to the spacer 10 of FIG. 1, so that reference can be made to the statements made in respect thereto.

The only difference from the spacer 10 of FIG. 1 is that the metal mesh 50 does not extend completely around the wall 15. Rather, a region 52 in strip form, which is free from metal mesh, is provided in the inner face 16. That is to say in other words that the two ends of the metal mesh do not adjoin or overlap each other but end at a distance from each other.

The advantage of this embodiment over the embodiment shown in FIG. 1 is that the thermal conductivity between the two abutment surfaces 18 can be reduced.

At this point it should be noted that the various exemplary embodiments described above may also be combined with one another. This means for example that a region 52 in strip form without a metal mesh could also be provided in the case of the spacer 10' of FIGS. 2*a*)-2*d*).

Altogether, the use of a metal mesh offers additional reinforcement of the main body, thereby enabling the wall thicknesses to be reduced. In this way, the thermal conductivity of the spacer can be further reduced.

Apart from the metal mesh, each of the spacers described above can also be provided with a mesh of a non-metal fiber material. All of the statements made with respect to the structure of the spacer continue to apply when a non-metal mesh is used, so that reference can be made to the previous statements.

Spacers with non-metal meshes have similar properties to spacers with metal meshes. Non-metal meshes also improve the insulating properties of the spacer. Non-metal fibers are in this case, for example, inorganic fibers, such as basalt fibers, boron fibers, glass fibers, ceramic fibers, silica fibers, organic fibers, such as aramid fibers, carbon fibers, polyester fibers, nylon fibers, polyethylene fibers, plexiglass fibers, or natural fibers, such as wood fibers, flax fibers, hemp fibers or sisal fibers.

What is claimed is:

1. A spacer for multi-pane insulating glazing, comprising:

a longitudinal main body, which has mutually parallel abutment surfaces for panes, an outer face and an inner face, which respectively connect the two abutment surfaces, the main body being made of plastic and having at least one metal layer on the outer face, and a metal mesh, which is embedded in the main body, wherein the outer face has a groove formed therein intermediate said two abutment surfaces, said groove having a base that is recessed relative to said outer face, and the metal layer extends from one abutment surface via the outer face to the other abutment surface except for an interruption in strip form in the base of the groove.

2. A spacer for multi-pane insulating glazing, comprising:

a longitudinal main body, which has mutually parallel abutment surfaces for panes, an outer face and an inner face, which respectively connect the two abutment surfaces, the main body being made of plastic and having at least one metal layer on the outer face, and a non-metal mesh, which is embedded in the main body, wherein the outer face has a groove formed therein intermediate said two abutment surfaces, said groove having a base that is recessed relative to said outer face, and the metal layer extends from one abutment surface via the outer face to the other abutment surface except for an interruption in strip form in the base of the groove.

3. The spacer as claimed in claim 1, wherein the metal mesh extends all around, along the abutment surfaces and the outer face and the inner face.

4. The spacer as claimed in claim 1, wherein the metal mesh consists of steel fibers.

5. The spacer as claimed in claim 2, wherein the non-metal mesh extends all around, along the abutment surfaces and the outer face and the inner face.

6. The spacer as claimed in claim 2, wherein the non-metal mesh consists of inorganic fibers, organic fibers and/or natural fibers.

7. The spacer as claimed in claim 1, wherein the metal mesh has a mesh width of 1 mm by 1 mm.

8. The spacer as claimed in claim 1, wherein the fibers of the metal mesh or the fibers of the non-metal mesh have in each case a diameter of 0.1 mm to 0.2 mm.

9. The spacer as claimed in claim 1, wherein the metal layer consists of high-grade steel.

10. The spacer as claimed in claim 1, wherein the interruption of said metal layer forms two ends in said metal layer and further wherein there is applied to the base of the groove a sealing material that contacts both of said two ends.

11. The spacer as claimed in claim 1, wherein the main body is produced by extrusion as a hollow profile with the embedded metal mesh.

12. The spacer as claimed in claim 1, wherein the metal layer has a thickness of at most approximately 0.01 mm.

13. The spacer as claimed in claim 1, wherein the metal layer is adhesively attached to the main body.

14. The spacer as claimed in claim 2, wherein the non-metal mesh has a mesh width of 1 mm by 1 mm.

15. The spacer as claimed in claim 2, wherein the fibers of the non-metal mesh or the fibers of the non-metal mesh have in each case a diameter of 0.1 mm to 0.2 mm.

16. The spacer as claimed in claim 2, wherein the metal layer consists of steel.

17. The spacer as claimed in claim 2, wherein the interruption of said metal layer forms two ends in said metal layer and further wherein there is applied to the base of the groove a sealing material that contacts both of said two ends.

18. The spacer as claimed in claim 2, wherein the main body is produced by extrusion as a hollow profile with the embedded non-metal mesh.

19. The spacer as claimed in claim 2, wherein the metal layer has a thickness of at most approximately 0.01 mm.

20. The spacer as claimed in claim 2, wherein the metal layer is adhesively attached to the main body.

21. The spacer as claimed in claim 1, wherein the metal mesh has a mesh width of 0.8 mm by 1 mm.

22. The spacer as claimed in claim 2, wherein the metal mesh has a mesh width of 0.8 mm by 1 mm.

23. The spacer as claimed in claim 10, wherein the sealing material comprises butyl.

24. The spacer as claimed in claim 17, wherein the sealing material comprises butyl.

25. The spacer of claim 1, wherein said longitudinal main body in cross-section comprises side walls presenting said parallel abutment surfaces, and lower and upper walls presenting said outer and inner faces, respectively, said walls creating an inner space, and further wherein said lower wall has a channel formed therein that protrudes into said inner space and creates said groove in said outer face.

26. The spacer of claim 2, wherein said longitudinal main body in cross-section comprises side walls presenting said parallel abutment surfaces, and lower and upper walls presenting said outer and inner faces, respectively, said walls creating an inner space, and further wherein said lower wall has a channel formed therein that protrudes into said inner space and creates said groove in said outer face.

27. The spacer of claim 1, wherein said metal layer is positioned on said outer face so as to comprise the exposed surface of said outer face.

28. The spacer of claim 2, wherein said metal layer is positioned on said outer face so as to comprise the exposed surface of said outer face.

* * * * *